Sept. 3, 1963 G. DIRKS 3,102,997

SELECTIVE TRANSFER OF MAGNETICALLY STORED DATA

Filed Jan. 5, 1960 2 Sheets-Sheet 1

INVENTOR.
Gerhard Dirks

BY

Michael S. Striker
Atty

Sept. 3, 1963 G. DIRKS 3,102,997

SELECTIVE TRANSFER OF MAGNETICALLY STORED DATA

Filed Jan. 5, 1960 2 Sheets-Sheet 2

INVENTOR.

BY 3,102,997
Patented Sept. 3, 1963

3,102,997

SELECTIVE TRANSFER OF MAGNETICALLY STORED DATA

Gerhard Dirks, 44 Morfelder Landstrasse, Frankfurt am Main, Germany

Filed Jan. 5, 1960, Ser. No. 525
Claims priority, application Great Britain Jan. 6, 1959
11 Claims. (Cl. 340—172.5)

Figure 1:
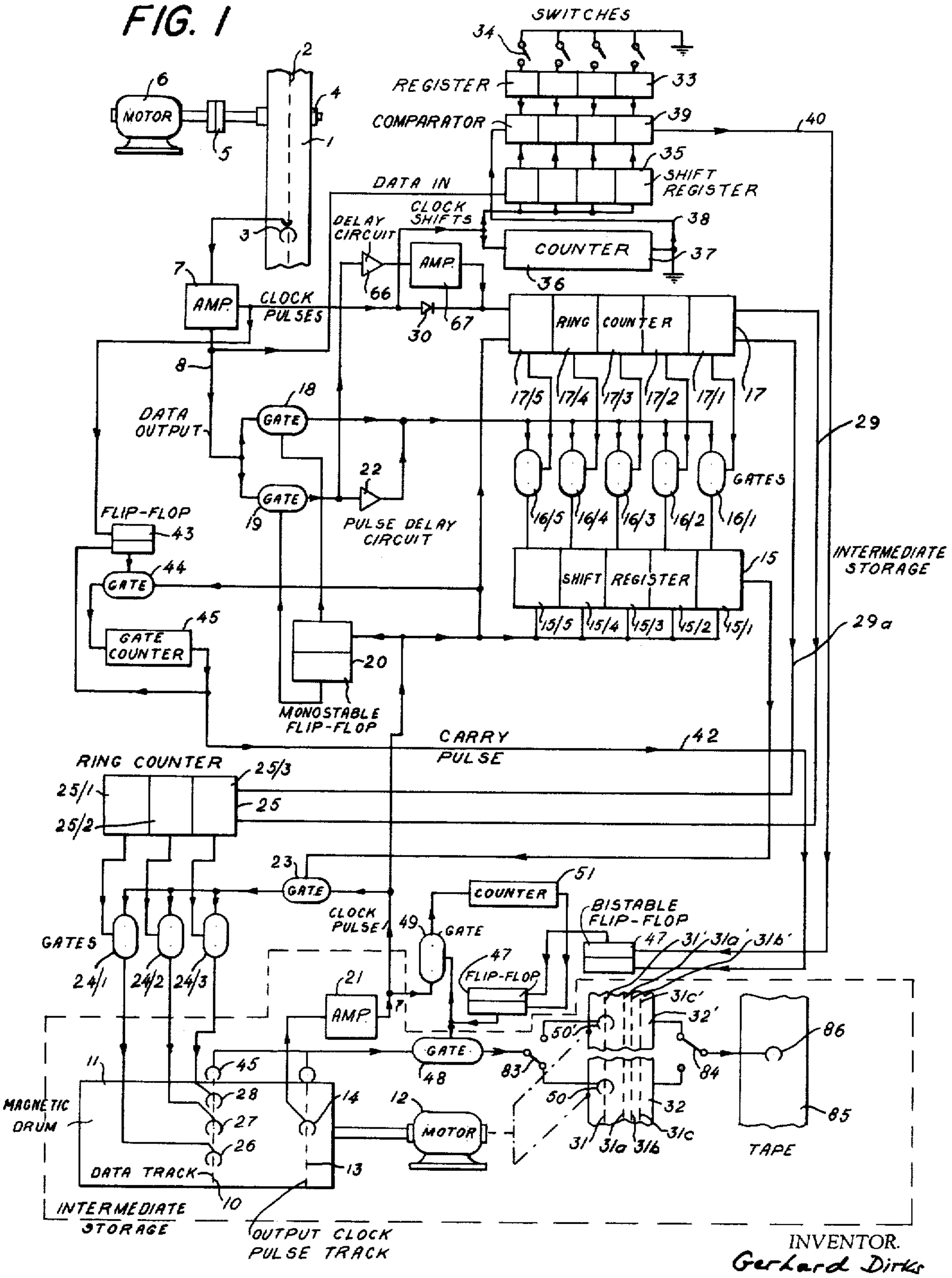

This invention relates to apparatus for the selective transfer of data from one data storage device to another.

The transfer of selected data words from a large group of stored words in dependence upon the significance of the whole word, or part of the word, is an operation which is frequently required in data processing equipment. This selective transfer forms the basis for sorting and collating data, for example. Various methods have been proposed for performing selective transfer from one magnetic data tape to another, for example. In one method, the first tape is provided with two reading stations spaced apart by the distance between adjacent words. The first station is used to read each word and to determine whether it should be transferred. If a particular word is to be transferred, the second station is made operatvie to read this word and supply signals to a recording station for the second tape. At the same time, the driving mechanism for the second tape is operated to feed the tape during the recording. It will be clear that such a method is not suitable for controlling transfer to a cyclically operating storage device, such as a magnetic drum or disc.

In another method, a block of words is first transferred to a temporary storage from the input tape, the words are processed one by one and the selected words are transferred to the output storage device, which may be a magnetic drum, a tape or other storage device. This arrangement requires sufficient temporary storage to accommodate the block of words and intermittent feeding of the input tape. The method is inefficient in that each block of words has to be transferred to the temporary storage even though the block may contain no words which are to be transferred.

It is an object of the present invention to provide an improved arrangement for selectively transferring data from an input storage device, such as a tape, to a cyclically operating storage device, such as a magnetic drum.

It is another object of the invention to provide apparatus for the selective transfer of data from an input tape to a cyclic storage device operating asynchronously in relation to the tape.

The invention provides an apparatus for the selective transfer of magnetically-stored data words from an input storage device to a cyclically-operating storage device, comprising a plurality of recording heads evenly spaced along a storage track of the cyclically-operating storage device, means for reading sequentially the data words recorded on the input storage device and for feeding them to one or more intermediate storage means the capacity of each of which is equal to the capacity of said storage track between two adjacent recording heads, detection means for initiating the read out from the intermediate storage of words having a pre-selected characteristic and a counter controlled jointly by timing pulses from the input and from the cyclic storage devices, the setting of the counter representing the relative positions at the instant of the start of the word being transferred from the input storage and a fixed point on said storage track, whereby the counter controls the read out from the intermediate storage means of the word to be transferred to the cyclically operating storage and selects a recording head on said track such that recording on that track begins at a pre-determined point.

Usually the input storage device will be a tape and the cyclically operating storage a rotating drum or disc, and the intermediate storage can be a shift register.

Figure 2:
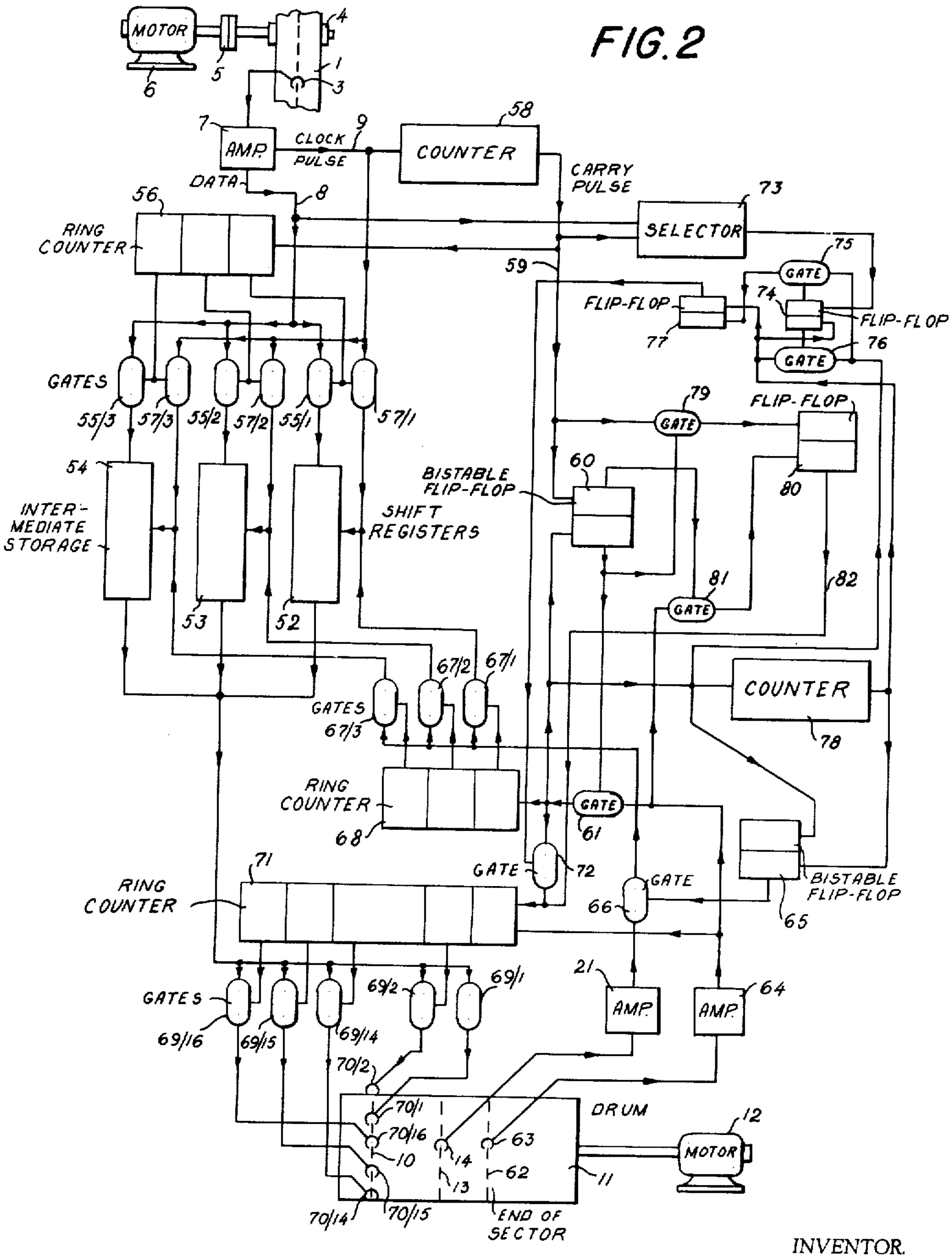

The invention will now be described by way of example, with reference to the accompanying drawings, in which:

FIG. 1 is a block schematic diagram of an arrangement for transferring data from a magnetic tape to a magnetic drum store; and FIG. 2 is a block schematic diagram of a modification of FIGURE 1.

A magnetic tape 1 (FIGURE 1) carries a data recording track 2. The tape can be fed past a magnetic reading head 3, so that the head senses signals recorded in the track 2. The feeding mechanism is indicated schematically by a feed roller 4, which can be driven through a friction cltuch 5 by a motor 6.

The signals induced in the winding of the head 3 are fed to an amplifier 7. The amplifier provides a source of data output signals on a line 8 and clock pulse corresponding to each data signal, on a line 9. The data in the track 2 may be recorded in binary, binary coded decimal or other desired form, but it is assumed that each data signal is positively recorded. For example, positive and negative magnetic saturation of the tape may be used to record a binary one and a binary zero, respectively. This enables a clock pulse train to be derived from the data signals, a clock pulse occurring for each data signal whether it is a one or a zero.

It is necessary that input clock pulse signals synchronised with the data source signals shall be available, but a separate clock pulse track on the tape and an associated reading head may provide the clock signals, instead of the clock signals being derived from the data signals.

The data read from the tape is recorded in a data track 10 of a temporary storage device in the form of a magnetic drum 11. The drum is continuously rotated by a motor 12. The drum also has an output clock pulse track 13, which is read by a magnetic head 14. It will be assumed that the drum is driven at such a speed that the average frequencies of the clock pulses from the tape and the drum are approximately the same. For example, the motors 6 and 12 may be synchronous motors driven from a common power supply. However, the movement of the tape and the drum are not mechanically synchronised in any way. Any changes in the relative speeds of the tape and the drum occur slowly relative to the frequency of the data signals and clock pulse trains, owing to the inertia of the driving arrangements.

The data is transferred from the tape to the drum through an intermediate store 15, which consists, in the present example, of a shifting register with five stages 15/1 to 15/5. Each data signal is entered into the register by means of one of five gates 16/1 to 16/5 which are controlled by the individual stages 17/1 to 17/5 of a ring counter 17. The state of the ring counter determines which of the gates 16 is operative to pass a data signal. Each stage of the register may consist of a conventional bi-stable flip-flop. Each stage of the register may be set by a data signal passed by the corresponding one of the gates 16, and each stage except the stage 15/1 may be set by the preceding stage in normal shift register fashion.

The data signal output line 8 is connected to the input of two gates 18 and 19. These two gates are controlled by the voltages at the two anodes of a conventional monostable flip-flop 20. The flip-flop is normally in the off state and the anode voltages are then such that the gate 18 passes the data signals on the line 8 and the gate 19 does not. The flip-flop is switched to the on state each time a clock pulse from the drum is applied to it from the head 14, via amplifier 21. The anode voltages are then such that the operative conditions of the gates 18 and 19 are interchanged. The output of the gate 18 is connected directly to the inputs of the gates 16/1 to 16/5. The output of the gate 19 is connected to the inputs of the gates 16/1 to 16/5 through a pulse delay circuit 22. The gates 18 and 19 prevent interference between data being read into and out of the register 15. The way in which this is achieved will be made clear in explaining the overall operation of data transfer.

The counter 17 is a conventional form of reversible ring counter with separate add and subtract inputs. Clock pulses from the tape are applied to one input over line 9 via an isolating diode 30. Clock pulses from the drum are applied by amplifier 21 to the other input. Each stage of the counter controls the corresponding one of the gates 16/1 to 16/5. A gate 16 is open only when the corresponding stage of the counter is in the on state, and only one stage of the counter is on at any particular time.

It will first be assumed, for the purpose of explanation of the circuit operation, that the drum and tape are running at the same speed and that the relative timing of the drum and the tape is such that a drum clock pulse occurs between each pair of clock pulses from the tape. Furthermore, it will be assumed that the stage 17/1 of the counter 17 is on and that the flip-flop 20 is off. When the first data signal is read from the tape by the head 3, the signal will be fed through the amplifier 7, line 8, gate 18 and gate 16/1 to set the stage 15/1 of the register 15 to the on or off state according to whether the signal represents a one or a zero, respectively. The stage 15/1 will be initially off, representing zero, under the postulated conditions, so that only a one signal would be effective to switch the stage.

A clock pulse will be produced on line 9 by the reading of the first data signal. Assuming that this line is connected to the add input of the counter 17, this pulse will add one, so that the stage 17/1 switches off and the stage 17/2 is switched on. There is an inherent delay in the switching of the counter stages and this allows the data signal to pass through the gate 16/1 before the stage 17/1 switches off and makes the gate 16/1 inoperative.

The voltage of one anode of the flip-flop forming the stage 15/1 of the register controls a gate 23, which also receives drum clock pulses from the amplifier 21. The output of the gate 23 is connected to the input of three gates 24/1 to 24/3. Each of these three gates is controlled by a corresponding one of the stages 25/1 to 25/3 of a ring counter 25, in the same way as the gates 16 are controlled by the counter 17. The outputs of the gates 24/1 to 24/3 are connected to recording heads 26, 27 and 28, respectively.

The heads 26, 27 and 28 are spaced apart along the data track 10 of the drum 11. Each of these heads is spaced apart from the next by a distance equal to that occupied by five consecutive data signal recording positions on the track 10, that is, corresponding to the maximum number of signals which can be held in the intermediate storage register 15.

One data signal from the tape has been stored in the intermediate storage register as represented by the setting of the stage 15/1 of the register. This stored signal is to be recorded in the first available recording position of the track 10 of the drum. These recording positions are defined by the clock track 13. The gate 23 will be operative to pass the next drum clock pulse to occur, if the stage 15/1 is registering one. The output of the gate 23 is fed in common to the inputs of the gates 24. It will be assumed that stage 25/3 of the counter 25 is on, so that the gate 24/3 passes the output of the gate 23 to the head 28. The head 28 will thus record a one signal in a recording position of track 10 of the drum. Each of the gates 24 preferably takes the form of a gated recording amplifier. The gate 24/3, for example, supplies no current to the recording head 28 when the stage 25/3 is off.

When the stage 25/3 is on but no signal is present at the input of the gate 24/3, the gate drives current through the recording head to saturate the magnetic surface of the drum in one direction to represent zero. The application of an input pulse then causes the direction of the recording current to be reversed to magnetically saturate the drum surface in the opposite direction to represent one. Alternatively, each anode of the stage 15/1 may control a gate corresponding to the gate 23. Clock pulses from the drum are applied to both gates, so that one or the other gate passes the clock pulse depending upon the setting of the stage 15/1. The gates 24 receive the output of one of these two gates directly and of the other through an inverter. The gates 24 receive a pulse of one polarity for a zero and of the opposite polarity for a one. Each of the gates 24 includes a conventional recording amplifier to record a one or a zero, by opposite magnetic saturation of the drum surface, according to the polarity of the pulse applied to the particular gate 24.

The drum clock pulse is also fed as a shift pulse to the register 15. The register will be set to register zero by the shift pulse, since the stages 15/2 to 15/5 were not set previously and the zero setting of stage 15/2 will be shifted into stage 15/1, the register shifting from left to right.

The drum clock pulse applied to the subtract input of the counter 17 will subtract one to switch the stage 17/2 off and to switch the stage 17/1 on. This returns the counter to the original setting.

The drum clock pulse will also switch on the flip-flop 20. The time constant of the flip-flop is such that it reverts to the off state after a time equal to the time required to shift the contents of the register 15 by one position. The gate 18 is closed and the gate 19 is opened for this time by the flip-flop, but, since the next data signal is not yet being read from the tape, no signal is passed by the gate 19.

After the flip-flop 20 has switched back to circuit is in the same condition as it was before the first signal was read from the tape. The next signal read from the tape will therefore be stored on stage 15/1 of the register and will then be read out by the next drum clock pulse and recorded in the track 10 of the drum, in the same manner as for the first signal. Subsequent signals read from the tape will be transferred to the drum in a similar manner, so long as the postulated conditions hold.

Now suppose that the tape begins to move faster relative to the drum. The time between the entry into and readout from the stage 15/1 will begin to increase, until a signal is being read from the tape at the same time as the previously read signal is being read out from the register stage 15/1. The flip-flop 20 will have been switched on by a drum clock pulse under these conditions and the gate 18 will be shut. However, the signal on the line 8 is passed by the gate 19, which is now open, to the delay circuit 22. The time delay provided by this circuit is sufficient to allow shifting of the register before the signal reaches the output of the delay circuit and is applied to the gates 16.

The subtract input of the counter 17 is provided with a pulse lengthening circuit, so that a pulse on this input overrides a pulse applied simultaneously on the add input. Thus the counter stage 17/1 is switched on, and the register stage 15/1 has been set to zero by the shift pulse, by the time the signal from the gate 19 is fed through the delay circuit 22 to the gates 16. The stage 15/1 will then be set in accordance with this signal from the delay circuit.

The signal from the gate 19 is also fed through another delay circuit 66 and amplifier 67 to the add input of the counter 17. This amplifier provides a delayed pulse, which occurs after the stage 15/1 has been set by the signal from the gate 19, to switch on the stage 17/2 of the counter.

If the next data signal is read from the tape before the next drum clock pulse occurs, the data signal will be passed by the gate 16/2, since the counter stage 17/2 is now on. When the drum clock pulse does occur it will read out the signal stored on stage 15/1 and will then shift the setting of stage 15/2 to stage 15/1, in readiness for reading out by the next occurring drum pulse.

Each time a data signal is read from the tape without the occurrence of a corresponding drum clock pulse the counter 17 will be advanced one stage and the data signal will be read into a higher stage of the register 15 than the preceding data signal. The limit is reached with a five stage register when five such signals have been read. A sixth signal would return the counter to the original state with stage 17/1 on, but the accompanying data signal would then be entered on a stage of the register which was still storing a previously entered signal and data would therefore be lost.

The condition in which the tape starts to run slower than the drum will now be considered and it will be seen that the limit of five signals difference between the tape and the drum does not apply in this case.

Initially, each data signal will be read into and then read out of the stage 15/1 of the register and will be recorded by the head 28, in the manner described earlier, but as the tape slows down at some point a drum clock pulse will occur before a corresponding data signal has been read from the tape. This clock pulse will switch off the counter stage 17/1 and will switch on the counter stage 17/5. This switching of the stage 17/5 by the stage 17/1 also generates a pulse on line 29*a*, which is connected to the subtract input of the ring counter 25. This pulse on line 29*a* switches off the stage 25/3 and switches on the stage 25/2, opening the gate 24/2 to feed signals from the gate 23 to the head 27.

The next data signal to be read from the tape will set stage 15/5 of the storage register through the gate 16/5 which is made operative by stage 17/5 being on. Five drum clock pulses are required to shift the setting of stage 15/5 along the register to stage 15/1 and to read out the signal to the gates 24. However, the head 27 is positioned five recording positions in advance of the head 28, so that the signal is applied to the head 27 at the correct time to record in the recording position following that in which the last recorded signal was recorded by the head 28.

The tape clock pulse on the line 9 which occurs with the data signal which sets stage 15/5 will operate the counter 17 and switch stage 17/1 on again. This transition from stage 17/5 to 17/1 generates a pulse on line 29, which is connected to the add input of the counter 25. The stage 25/3 is thus switched on. However, the next drum clock pulse switches the counter 17 again to put stage 17/5 on and a further pulse is produced on the line 29*a*. This pulse operates counter 25 to switch on stage 25/2 again. The drum clock pulse also shifts the setting of stage 15/5 of the register to stage 15/4, leaving stage 15/5 ready to be set by the next incoming data signal from the tape.

Another drum clock pulse without a corresponding data signal from the tape will switch on stage 17/4 of the counter, so that the incoming signals from the tape will set this stage. Subsequent unaccompanied drum clock pulses will each step the counter 17 by one stage. A further three such pulses will switch on the stage 17/1. One further unaccompanied drum pulse will then switch on stage 17/5. This will produce a pulse on line 29*a*, as before, and counter stage 25/1 will be switched on. This will make the head 26 operative for recording in the track 10 of the drum. This head is advanced by ten signal positions in relation to the head 28.

Further unaccompanied drum pulses will cause stepping of the counter 17 in the manner already described. The limit is reached when the stage 17/1 is normally on once again, since a further unaccompanied drum pulse would again cause operation of the counter 25 and the head 28 would be made operative. Thus, the tape may lag in relation to the drum by up to fifteen signals in the case of the embodiment described. The permissible lag may be increased by providing further heads equally spaced apart along the track 10, the number of gates 24 and stages of the counter 25 being increased correspondingly.

It will be seen that the intermediate storage formed by the register 15 needs to have a capacity only equal to the number of consecutive recording positions which separate adjacent heads on the track 10. The selection of the correct position for entry into the intermediate store is controlled by the counter 17, which is driven in one direction for each entry and in the other direction for each readout. The counter 17 and the gates 16 operate as a stepping switch which may be moved forwards or backwards. It will be appreciated that this stepping switch action may be obtained equally well by using known forms of bidirectional commutators and that the counter may be replaced by a five stage reversible shifting register of which only one stage is on.

The counter 25 and the gates 24 act as a stepping switch in a similar manner to select the particular head to be used for recording each signal read out from the intermediate store. It is convenient to drive the counter 25 by carry pulses derived from the counter 17. However, it is necessary only that the counter 25 should be operated when the tape changes from lagging to leading the drum or vice versa and when the tape lags by five signals or a multiple thereof. The leading or lagging relationship of the tape to the drum is indicated by the difference between the number of input clock pulses which have been generated by the tape as compared with the number of output clock pulses generated by the drum. Hence the counter 25 may be driven by any suitable counting arrangement which is operated by the two sets of timing pulses to form the difference and which provides an indication each time the difference is zero modulo five and each time the sign of the difference changes.

The synchronous transfer of data from the tape 1 to the intermediate store formed by the track 10 of the magnetic drum 11 has been explained. The selective transfer of data from the track 10 to a final store in the form of a track 31 on a large capacity magnetic drum store 32 will now be considered. The drum 32 is driven in synchronism with the drum 11 by the motor 12. The embodiment thus far described may be improved if a further drum 32' (or a further storage area on the same drum) is provided in addition to the drum 32. This has the advantage that the repeated starting and stopping of the drum is avoided. The two drums are driven by a motor 12. Each drum 32 and 32' contains track 31 or 31' respectively and further tracks 31*a*, 31*b*, 31*c* . . . or 31*a'*, 31*b'* . . . respectively; the drums cooperate in such a manner that while one of the two drums receives data from the recording head 50 the other one transmits the signals recorded in tracks 31, 31*a*, 31*b* to a further storage means, for instance a tape 85. The operation of the two drums is controlled by two switches 83 and 84 one of which connects the gate 48 to one of the drums 32 or 32' respectively, whereas the second switch connects the other drum, which is not connected to gate 48, to the tape 85. Preferably the drums 32 and 32' may each contain ten tracks. In the operation of this arrangement the switches 83 and 84 are simultaneously actuated when a group of ten tracks is filled so that the content of this group of tracks can be transferred to the tape 85. At the same time the other drum receives new information from the head 50'. The motor 12 is connected to the shafts of the drums by a clutch and this clutch is controlled by the tracks of the drum in such a manner that the clutch of the motor is operated when the tracks of the drum are filled. The recording head 50 or 50' respectively is shifted laterally after the desired number has been recorded on the track of the drum 32 or 32' respectively, so that a new track can be recorded. Instead of shifting the head laterally from one track to the next one it is also possible to use a separate recording head for each track and to provide a corresponding switching arrangement for these heads. It is also possible to shift the drums either stepwise or continuously relatively to the recording heads. Preferably, the track 10 is of such a length that it accommodates rather more than one word and the track 31 is sufficiently long to accommodate a considerable number of words. The expression "word" is used to designate a fixed number of characters, say twenty, which are recorded on the tape 1 as a group, each group being spaced from adjacent groups.

For simplicity of explanation, it will be assumed that the selective transfer of each word is determined by the presence or absence of a particular character in a selected position in the word, and that each character is represented by a four element binary code.

Switches 34 are operate dselectively, before the transfer of data from the tape is started, to set the four stages of register 33 in accordance with the binary code representation of the particular character which is to control selection.

The operation of these switches 34 can be effected manually. It is, however, preferred to operate the switches by means of a program control so that the switches are not permanently set to a certain number but are operated selectively in accordance with a program in conformity with the desired address. This control may be effected by a further tape containing magnetic signals for operating the switches.

The data signals on the line 8 are fed to the input of a shift register 35. The register is shifted by the clock pulse signals occurring on the line 9. Consequently, the data read from the tape is shifted through the register 35, which holds four code elements.

The clock pulses on the line 9 are also fed to the input of a counter 36. This counter has a counting capacity equal to the number of code elements in a word. It is set by operation of a switch 37 to register a value equal to the number of code elements in the word which follow the character selected to control transfer. For example, the counter is set to register if there are two characters following the selected character, that is, the selected character is the eighteenth in each word. The capacity of the counter is eighty, so that the application of the last of seventy-two clock pulses will produce a carry pulse on line 38 which is connected to the input of a comparator 39. This last clock pulse is produced by the last code element of the eighteenth character. There is sufficient delay in the generation of the carry pulse to allow the shift register to be operated by the clock pulse. Thus the shift-register is holding the four code elements of the eighteenth character when the comparator 39 is pulsed. The comparator 39 consists of four series-connected coincidence gates, each gate being controlled by one stage of the shift register 35 and the corresponding stage of the register 33. The comparator 39 will produce an output pulse on line 40 only if the settings of the two registers are the same. A pulse on line 40 therefore indicates that the word being read contains the particular character in the eighteenth position.

The line 40 is connected to one input of a bi-stable flip-flop 41. A pulse on the line 40 switches on the flip-flop 41. The flip-flop 41 is switched off, after the end of the recording of each word on the drum 11, by a pulse on a line 42. This pulse is produced in the following way. One input of a flip-flop 43 is connected to the clock pulse line 9. The first clock pulse to occur at the start of reading a word from the tape switches on the flip-flop 43. An output from the flip-flop 43 is applied to gate 44 to open it to pass drum clock pulses from the amplifier 21 to the input of a counter 45. The counter 45 has a counting capacity equal to the number of recording positions in the track 10 less one more than the number of recording positions separating the recording head 28 and a reading head 46. The first clock pulse applied to the counter 45 coincides with the recording of the first code element of a word on the drum 11. Clock pulses continue to be fed to the counter, so that it will produce a carry pulse on the line 42 just before the first code element recorded in the track 10 passes the reading head 46.

If the flip-flop 41 has been switched on by a pulse on the line 40, it will be switched off by the pulse on the line 42. One anode of the flip-flop 41 is capacitatively coupled to one input of a flip-flop 47, so that the flip-flop 41 in switching off applies a pulse to flip-flop 47 to switch it on. When flip-flop 47 switches on it opens a gate 48 to allow signals read by the head 46 to be applied to a recording head 50. The recording head 50 is aligned with the track 31 of the drum 32. The flip-flop 47 also opens a gate 49 to allow drum clock pulses from the amplifier 21 to be fed to input of a counter 51. This counter has a capacity equal to the number of code elements in a word and will therefore produce a carry pulse following the reading of the last code element of the word by the head 46. This carry pulse is applied to the other input of the flip-flop 47 to switch it off. Thus, the gate 48 is open for the time required to read the selected word from the track 10 and record it in the track 31.

The spacing of the words on the tape 1 is such that the second word begins to read just after reading of the first word has begun on the drum 11. The flip-flops 41 and 43 have been switched off by the carry pulse from the counter 45, and are therefore ready for a new cycle of operation. If the second word does not contain the chosen character in the selected position, there will be no pulse on line 40, so that the flip-flop 47 will remain off and the gate 48 will remain closed. Thus, although the second will be written over the first word recorded in the track 10, it will not be recorded in the track 31. The circuit operates in a similar manner for subsequent words which are read from the tape, only the selected words being recorded in the track 31.

The provision of heads spaced apart equally round the circumference of the drum 11 allows recording of a block of data to commence at a specified point of the track 10 and selective recording of groups of characters. This may be effected by the arrangement shown in FIGURE 2, which also shows a modified form of intermediate store. Corresponding elements in FIGURES 1 and 2 are given the same references.

The intermediate store consists of three shift registers 52, 53 and 54. The track 10 is divided up into sixteen sectors each consisting of eight recording positions and the spacing between adjacent recording heads is equal to eight consecutive signal recording positions, that is, the spacing is equal to one sector and each of the registers 52, 53 and 54 has eight stages.

The data output signals on the line 8 are fed to the inputs of three gates 55/1 to 55/3. Each gate is controlled by one stage of a ring counter 56. Each stage of the counter also controls one of a group of gates 57/1 to 57/3. The gates 57 are fed in common from the tape clock pulse line 9. The tape clock pulses are also fed to the input of a counter 58. The counter 58 has a counting capacity equal to that of each of the registers 52, 53 and 54.

It will be assumed that the initial setting of the counter 58 is such that the gate 55/1 and 57/1 are open and that the counter 58 is registering zero. This allows data signals from the amplifier 7 to be fed via line 8 and the gate 55/1 to the input of the register 52. The clock pulses on line 9 are fed through the gate 57/1 to act as shift pulses for the register 52, so that each signal applied to the register is entered into the register under control of the associated tape clock pulse and is shifted along the register under control of subsequent tape clock pulses in conventional manner.

The register 52 is fully loaded after eight data signals corresponding to eight code elements to be recorded in one sector of the drum, have been read from the tape 1.

At the same time the counter 58 has received eight clock pulses from the line 9 and as a result of the eighth it produces a carry pulse on line 59. This pulse steps on the counter 56. The counter 56 then opens the gates 55/2 and 57/2 and shuts the gates 55/1 and 57/1. Hence, the next eight data signals to be read from the tape will be fed to the register 53.

A further pulse will be produced by the counter 58 on the line 59 to step on the counter 56, at the same time as the eighth data signal is entered into the register 53. The next eight signals will therefore be fed into the register 54. When the register 54 is full the counter 56 receives a further pulse from the counter 58 which will cause it to be switched to the setting to open the gates 55/1 and 57/1. The register 52 will have been emptied by this time, as will now be explained, and is therefore free to accept a further group of data signals from the gate 55/1.

The pulses from the counter 58 are also fed to one input of a bi-stable flip-flop 60 to switch it on. The voltage of one anode of the flip-flop 60 is applied to a gate 61 to hold it open as long as the flip-flop 60 is on. A track 62 on the drum 11 has a recorded signal corresponding to the end of each sector of the data track 10. These signals are sensed by a head 63 which drives an amplifier 64. The end of sector pulses from the amplifier 64 are fed to the input of the gate 61. Consequently, the gate 61 produces an output pulse in response to the first end of sector pulse to occur after the flip-flop 60 has been switched on, that is, after the register 52 has been filled.

The output pulse from the gate 61 is applied to the other input of the flip-flop 60 to switch it off and to one input of a bi-stable flip-flop 65 to switch it on. The voltage of one anode of the flip-flop 65 is applied to a gate 66 to hold it open as long as said flip-flop is on. The gate 66 then allows drum clock pulses to be fed from the output of the amplifier 21 to three gates 67/1 to 67/3. These three gates are controlled by three stages of a ring counter 68.

The counter 68 is set before the start of a data transfer to open the gate 67/3. The output pulse of the gate 61 is fed to the add input of the counter 68, so that the first pulse steps on the counter 68 and the gate 67/1 is opened. This allows drum clock pulses to be applied through the gate 67/1 as shift pulses to the register 52 to read out in succession the data signals stored in said register. The output signals from the last stage of the register are fed to a group of sixteen gates 69/1 to 69/16, of which only five gates are shown. The outputs of the gates 69/1 to 69/16 are connected to corresponding ones of sixteen heads 70/1 to 70/16 which are each spaced apart by a distance equal to a sector along the track 10.

The gates 69 are controlled by the individual stages of a sixteen stage ring counter 71. End of sector pulses from the amplifier 64 are fed to the subtract input of the counter 71 and pulses from the gate 61 are fed to the add input via a gate 72. Before a transfer starts, the counter 71 is driven only by the end of sector pulses since the gate 61 is not opened until the register 52 has been filled. These pulses step the counter 71 so that as the last sector of the track 10 reaches a particular head the corresponding gate 69 is opened by the corresponding stage of the counter 71 being switched on. Thus the first stage of the counter 71 is on to open gate 69/1 during the travel of the last sector past the head 70/1. The end of sector pulse occurring as the end of that sector passes the head 70/1 subtracts one from the counter 71 so that the last stage of the counter 71 is switched on to open the gate 69/16. The last sector now passes the head 70/16 and the next end of the sector pulse switches on the next counter stage to open gate 69/15 and so on. Thus, before a data transfer starts, the counter 71 switches the gates 69 sequentially in such a way that the gate 69 which is open is always that one which drives the recording head which is positioned to record in the last sector of the track 10.

When a transfer is to start, because the register 52 has been filled the gate 61 is open and the add input of the counter 71 receives an end of sector pulse, the gate 72 being open at this time and the subtract input receives the same pulse direct. The simultaneous pulses on both inputs cancel each other and the counter is not stepped on. If the last sector had just passed the head 70/14, for example, at the time of the pulse from the gate 61 then the gate 69/14 will have been open for one sector and will now remain open for the passage of the next sector, since the counter 71 has not been stepped on. This next sector is the first sector of the track 10, and the head 70/14 will therefore record the signals read out from the register 52 in the first sector of the track.

The data signals on the line 8 are fed to a selector 73, which determines whether or not each pair of characters held in the register 52, 53 and 54 is to be selected. It may be similar to the circuit including register 33, comparator 39, register 35 and counter 37, which is used for this purpose in the arrangement of FIG. 1, the counter 37 being modified to operate on two characters at a time, instead of the word of twenty characters.

Each time one of the registers 52, 53 or 54 has been filled, the counter 58 generates a carry pulse which is applied to the selector 73. The selector 73 will pass the pulse if the register contents are required, to one input of flip-flop 74 to switch it on. The flip-flop 74 controls gates 75 and 76. Gate 76 is open if the flip-flop 74 is on and gate 75 is open if said flip-flop is off.

It will be assumed that the first pair of characters are not to be selected. The flip-flop 74 will be off since it has not received a pulse from the selector 73. The first end of sector pulse to be passed by the gate 61 is applied to both gates 75 and 76. This pulse will be passed by gate 75 to a flip-flop 77 to switch it off. The flip-flop 77 controls the gate 72, closing it when said flip-flop is off. The flip-flop 77 is on at the start of the tape reading operation. The time taken for the flip-flop 77 to switch allows the first sector pulse to pass through the gate 72 before it is closed. The character stored by the register 52 will therefore be recorded in the first sector as described above.

The register 53 will be filled from the tape during the recording of the contents of the register 52, if the tape and drum are running at the same effective speed. Hence the flip-flop 60 will be switched on by a pulse from the counter 58, and the gate 61 will be open to pass the second end of sector pulse. The pulse will be fed to the counter 68 to operate it to open the gate 67/2 to apply shift pulses to the register 53. However, the gate 72 is shut because the flip-flop 77 is off. The counter 71 will receive the end of sector pulse direct from the amplifier 64 only. The counter will therefore be operated to switch in the next head, so that the second pair of characters will be recorded in the first sector. The first pair of characters will be erased by the over-writing of the second pair of characters.

If the second pair of characters are to be selected, the flip-flop 74 will be switched on by a pulse from the selector 73 at the end of reading these characters from the tape. The second end of sector pulse will be passed by the gate 76 to switch the flip-flop 74 off and to switch on the flip-flop 77. The third end of sector pulse will therefore be passed by the gates 61 and 72 to the counter 71, which will not be stepped. This will cause the third pair of characters to be recorded in the second sector, leaving the second pair of characters recorded in the first sector. The circuit operates in a similar manner for following pairs of characters, each pair of characters being written over the preceding pair of characters unless that pair is selected. In this way, the record finally produced in the track 10 consists only of the selected pairs of characters.

The transfer of data from the tape to the drum is terminated by switching off the flip-flop 65 by a pulse from a counter 78. The counter 78 has a capacity equal to one more than the number of groups of signals to be transferred and is operated each time the gate 61 produces an output pulse. The counter 78 will thus produce a carry pulse for application to the flip-flop 85 on completion of recording of the required number of pairs of characters. The switching off of the flip-flop 65 closes the gate 66 to prevent any further shift pulses being applied to read out from the registers. The pulse from the counter 78 is also applied to the flip-flop 77 to switch it on in preparation for the next transfer operation.

If the tape speed is less than that of the drum, a drum end of sector pulse may occur before all the data to be recorded in that sector has been entered into one of the registers so that the flip-flop 60 has not yet been switched on. Thus the counter 71 receives a pulse on the subtract input only. This will step on the counter 71 to open the gate 69/13, thus providing an effective delay in the same manner as in switching between the heads 26, 27 and 28 of FIGURE 1.

If the tape runs faster than the drum the add input of the counter 71 receives an extra pulse in the following way.

A gate 79, which receives the pulses on line 59, is opened by the flip-flop 60 when it is on. The gate 79 will pass a pulse only if the flip-flop 60 is already on at the time when the pulse occurs, that is, when this pulse occurs before the flip-flop 60 has been reset by a drum end of sector pulse. The pulses passed by the gate 79 are applied to one input of a flip-flop 80 to switch it on.

A gate 81 receives end of sector pulses from the amplifier 64. The gate 81 is opened by the flip-flop 60 when said flip-flop is off. The output of the gate 81 is applied to the other input of the flip-flop 80 to switch it off. In switching off, the flip-flop 80 produces an output pulse on a line 82 which is connected in common with the output of the gate 72.

Thus, if the tape runs sufficiently fast for two pulses to occur on line 59 without the occurrence of an end of sector pulse, the flip-flop 80 will be switched on via the gate 79. The flip-flop 80 is set only if the drum has lagged behind the input data by one sector. The drum continues to record continuously, but one of the registers 52, 53, 54 is now full, while data is being read out of a second of the registers and data is being read into the third of the registers. The flip-flop 80 will remain on as long as the tape continues to lead the drum by more than one sector. Eventually an end of sector pulse will occur when the flip-flop 60 is off, because either the tape has slowed down, or the last character of a block has already been read in to the intermediate store register. The gate 81 is open under these conditions, so that the flip-flop 80 will be switched off and the resultant pulse will have the same effect as if the gate 61 had passed the end of sector pulse. This allows operation for one extra sector to clear the registers 52, 53, 54. The setting of the flip-flop 80 stores an indication that the tape is leading the drum by more than one sector.

It will be apparent that the amount by which the drum can lag behind the tape, once recording has started, is limited in both modifications, by the amount of data which can be held in the intermediate store. On the other hand the drum may lead the tape by any number of revolutions if heads are spaced apart all the way round the track 10. Consequently the tape speed would normally be adjusted so that it is slightly less than that of the drum.

It will be appreciated that the head selection arrangement of FIGURE 2 may be used with the intermediate store of FIGURE 1 if the necessary number of heads are provided for the track 10.

The effect of the counter which controls selections of the heads associated with the track 10 may be summarised in the following way. The initial setting of the counter is such that, if drum sector pulses only are applied to it, the heads are switched in sequence with the operative head always being that one which can record in the first sector. Thus although the whole of the first sector is available for recording during each sector interval, the drum is in effect stationary as far as the different sectors are concerned, that is, successive recording would occur in the same, not successive, sectors. The occurrence of an input to the counter under control of the tape causes a relative phase shift between the drum and the counting cycle, so that the operative head becomes that which can record in the second sector and so on. Such an input occurs at the start of every transfer and thereafter only when a selected pair of characters have been read.

If the heads are controlled by the counter in the sequence opposite to that shown, then the drum and tape pulses are applied to the add and subtract inputs, respectively, of the counter. If the tape is always lagging in relation to the drum, the control counter may be simply an adding (or subtracting) counter, which receives the drum sector pulses through a gate which is effective to suppress one sector pulse for each output pulse from the tape counter 17 or 58.

Although a magnetic tape has been used as an example of a data source, it may readily be replaced by a paper tape or a punched card, or the amplifier 7 may receive serial signals directly from a computer. The drum store 11 may be replaced by a disc with the tracks recorded on the flat face.

The main store has been described as a continuously operating cycle store, in the form of a continuously rotating magnetic drum. It is not necessary that the main store should operate in this manner, but merely that it should provide a series of storage locations which are accessible in succession and that clock pulses synchronously as the locations become available. For example, the arrangement shown in FIGURE 1 would operate in a manner similar to that already described if the tracks 10 and 14 were on a magnetic tape instead of a magnetic drum. Similarly, magnetic tape may be used in the arrangement of FIGURE 2 provided that the tape carries a track 62 in which are recorded block marker signals corresponding to the end of sector signals, or that the equivalent of end of sector pulses are provided by a counter operated by the output clock pulses.

When the storage drum 11 forms part of a computer it may be possible to utilise registers which form part of the arithmetic unit of the computer as the intermediate store, since the capacity of the intermediate store is relatively small.

The various circuit elements shown in block form in the drawings are well known per se. For example, suitable gates, amplifiers, flip-flops and ring counters are described in chapter II of "Description of a Magnetic Drum Calculator," published by Harvard University Press (1952). A suitable shifting register is described on page 104 of "Automatic Digital Calculators" by A. D. and K. H. V. Booth, published by Butterworths (1953).

I claim:

1. A circuit arrangement for selectively transferring data signals from a data input source to a series of storage locations of main data storage means comprising, in combination, input timing pulse generating means for generating input timing pulses synchronized with the data signals of said data input source; output timing pulse generating means for generating output timing pulses synchronized with the availability of the storage locations of said main data storage means; intermediate data storage means having a plurality of settable data signal storage positions; input transmitting means for transmitting data signals from said data input source to said intermediate data storage means and for recording transmitted data signals in the said intermediate data storage means; input switching means connected in said input transmitting means and controlled by both input and output timing pulses for selecting which storage position of said intermediate data storage means is to be set in accordance with each data signal of said data input source; output transmitting means for transmitting data signals from said intermediate data storage means to said main data storage means and for recording transmitted data signals in successive storage locations of the said main data storage means; and output switching means connected in said output transmitting means and controlled by both input and output timing pulses for selecting a storage location of said main data storage means in which selected groups of data signals forming words having a preselected characteristic stored in said intermediate data storage means are to be stored in accordance with the difference between the number of input timing pulses and the number of output timing pulses so that said selected groups of data signals are stored in said main data storage means independently of variation within predetermined limits of the time of occurrence of said data signals in relation to the availability of said storage locations, said output switching means comprising means for comparing the number of input timing pulses with the number of output timing pulses and for providing an output varying in accordance with the difference between said number of input timing pulses and said number of output timing pulses and selecting means for initiating the transmission from said intermediate data storage means to said main data storage means of words having a preselected characteristic, said selecting means including comparing means for comparing transmitted data signals with preselected data signals and control means for controlling said output switching means to permit the transfer to said main data storage means of words having said preselected characteristic and to prevent the transfer to said main data storage means of other words.

2. A circuit arrangement for selectively transferring data signals from a data input source including a magnetic tape having data signals recorded thereon and from which said data signals are sensed serially to a series of storage locations of main data storage means comprising, in combination, input timing pulse generating means for generating input timing pulses from data signals sensed from said magnetic tape; output timing pulse generating means for generating output timing pulses synchronized with the availability of the storage locations of said main data storage means; intermediate data storage means having a plurality of settable data signal storage positions; input transmitting means for transmitting data signals from said data input source to said intermediate data storage means and for recording transmitted data signals in the said intermediate data storage means; input switching means connected in said input transmitting means and controlled by both input and output timing pulses for selecting which storage position of said intermediate data storage means is to be set in accordance with each data signal of said data input source; output transmitting means for transmitting data signals from said intermediate data storage means to said main data storage means and for recording transmitted data signals in successive storage locations of the said main data storage means; and output switching means connected in said output transmitting means and controlled by both input and output timing pulses for selecting a storage location of said main data storage means in which selected groups of data signals forming words having a preselected characteristic at a preselected position in each word stored in said intermediate data storage means are to be stored in accordance with the difference between the number of input timing pulses and the number of output timing pulses so that said selected groups of data signals are stored in said main data storage means independently of variation within predetermined limits of the time of occurrence of said data signals in relation to the availability of said storage locations, said output switching means comprising means for comprising the number of input timing pulses with the number of output timing pulses and for providing an output varying in accordance with the difference between said number of input timing pulses and said number of output timing pulses and selecting means for initiating the transmission from said intermediate data storage means to said main data storage means of words having a preselected characteristic at a preselected position in each word, said selecting means comprising reference register means, means for registering signals corresponding to said preselected characteristic in said preselected position in said reference register means, input data register means, means for registering in said input data register means data signals transmitted from said data input source, comparing means for comparing the signals registered in said reference and input data register means and for indicating coincidence in identity and position between said signals corresponding to said predetermined characteristic and said data signals and control means for controlling said output switching means to permit the transfer to said main data storage means of words having said preselected characteristic in a preselected position and to prevent the transfer to said main data storage means of other words.

3. A circuit arrangement for selectively transferring data signals from a data input source including a magnetic tape having data signals recorded thereon, said data signals being sensed serially from said magnetic tape to a series of storage locations of main data storage means comprising, in combination, input timing pulse generating means for generating input timing pulses from timing signals sensed from said magnetic tape; output timing pulse generating means for generating output timing pulses synchronized with the availability of the storage locations of said main data storage means; intermediate data storage means having a plurality of settable data signal storage positions; input transmitting means for transmitting data signals from said data input source to said intermediate data storage means and for recording transmitted data signals in the said intermediate data storage means; input switching means connected in said input transmitting means and controlled by both input and output timing pulses for selecting which storage position of said intermediate data storage means is to be set in accordance with each data signal of said data input source; output transmitting means for transmitting data signals from said intermediate data storage means to said main data storage means and for recording transmitted data signals in successive storage locations of the said main data storage means; and output switching means connected in said output transmitting means and controlled by both input and output timing pulses for selecting a storage location of said main data storage means in which selected groups of data signals forming words having a preselected plurality of characters at preselected positions in each word stored in said intermediate data storage means are to be stored in accordance with the difference between the number of input timing pulses and the number of output timing pulses so that said selected groups of data signals are stored in said main data storage means independently of variation within predetermined limits of the time of occurrence of said data signals in relation to the availability of said storage locations, said output switching means comprising means for comparing the number of input timing pulses with the number of output timing pulses and for providing an output varying in accordance with the difference between said number of input timing pulses and said number of output timing pulses and selecting means for initiating the transmission from said intermediate data storage means to said main data storage means of words having a preselected plurality of characters at preselected positions in each word, said selecting means comprising reference register means, means for registering signals corresponding to said preselected characters in said preselected positions in said reference register means, input data register means, means for registering in said input data register means data signals transmitted from said data input source, comparing means for comparing the signals registered in said reference, and input data register means and for indicating coincidence in identity and position between said signals corresponding to said predetermined characteristic and said data signals and control means for controlling said output switching means to permit the transfer to said main data storage means of words having said preselected characters in said preselected positions and to prevent the transfer to said main data storage means of other words.

4. A circuit arrangement for selectively transferring data signals from a data input source including a magnetic tape having data signals recorded thereon and from which said data signals are sensed serially to a series of storage locations of main data storage means comprising, in combination, input timing pulse generating means for generating input timing pulses from data signals sensed from said magnetic tape; output timing pulse generating means for generating output timing pulses synchronized with the availability of the storage locations of said main data storage means; intermediate data storage means having a plurality of settable data signal storage positions, said intermediate data storage means comprising a shift register having a plurality of stages, each of said stages comprising a settable data signal storage position and each stage having an input; input transmitting means for transmitting data signals from said data input source to said intermediate data storage means and for recording transmitted data signals in the said intermediate data storage means; input switching means connected in said input transmitting means and controlled by both input and output timing pulses for selecting which storage position of said intermediate data storage means is to be set in accordance with each data signal of said data input source, said input switching means including a plurality of gates, each of said gates being adapted to be controlled to one of an open and closed condition and each of said gates being connected to a corresponding one of said shift register stage inputs, and means for controlling the condition of said gates in accordance with said input and output timing pulses, said input transmitting means being connected to transmit data signals from said data input source to the inputs of the stages of said shift register through said gates; output transmitting means for transmitting data signals from said intermediate data storage means to said main data storage means and for recording transmitted data signals in successive storage locations of the said main data storage means; and output switching means connected in said output transmitting means and controlled by both input and output timing pulses for selecting a storage location of said main data storage means in which selected groups of data signals forming words having a preselected characteristic at a preselected position in each word stored in said intermediate date storage means are to be stored in accordance with the difference between the number of input timing pulses and the number of output timing pulses so that said selected groups of data signals are stored in said main data storage means independently of variation within predetermined limits of the time of occurrence of said data signals in relation to the availability of said storage locations, said output switching means comprising means for comparing the number of input timing pulses with the number of output timing pulses and for providing an output varying in accordance with the difference between said number of input timing pulses and said number of output timing pulses and selecting means for initiating the transmission from said intermediate data storage means to said main data storage means of words having a preselected characteristic at a preselected position in each word, said selecting means comprising reference register means, mean for registering signals corresponding to said preselected characteristic in said preselected position in said reference register means, input data register means, means for registering in said input data register means data signals transmitted from said data input source, comparing means for comparing the signals registered in said reference and input data register means and for indicating coincidence in identity and position between said signals corresponding to said predetermined characteristic and said data signals and control means for controlling said output switching means to permit the transfer to said main data storage means of words having said preselected characteristic in a preselected position and to prevent the transfer to said main data storage means of other words.

5. A circuit arrangement for selectively transferring data signals from a data input source including a magnetic tape having data signals recorded thereon and from which said data signals are sensed serially to a series of storage locations of main data storage means comprising, in combination, input timing pulse generating means for generating input timing pulses from data signals sensed from said magnetic tape; output timing pulse generating means for generating output timing pulses synchronized with the availability of the storage locations of said main data storage means; intermediate data storage means having a plurality of settable data signal storage positions, said intermediate data storage means comprising a shift register having a plurality of stages, each of said stages comprising a settable data signal storage position and each stage having an input; input transmitting means for transmitting data signals from said data input source to said intermediate data storage means and for recording transmitted data signals in the said intermediate data storage means; input switching means connected in said input transmitting means and controlled by both input and output timing pulses for selecting which storage position of said intermediate data storage means is to be set in accordance with each data signal of said data input source, said input switching means comprising a plurality of gates, each of said gates being adapted to be controlled to one of an open and closed condition and each of said gates being connected to a corresponding one of said shift register stage inputs, ring counter means adapted to be operated additively by one of said input and output timing pulses and adapted to be operated subtractively by the other of the said input and output timing pulses, said ring counter means having a plurality of stages, each of said ring counter stages being connected to a corresponding one of said gates in a manner whereby each of the said ring counter stages controls the condition of its corresponding gate, and input connecting means for applying said input and output timing pulses to said ring counter means in a manner whereby the difference between the number of the said input timing pulses and the number of the said output timing pulses controls the condition of said gates, said input transmitting means being connected to transmit data signals from said data input source to the inputs of the stages of said shift register through said gates; output transmitting means for transmitting data signals from said intermediate data storage means to said main data storage means and for recording transmitted data signals in successive storage locations of the said main data storage means; and output switching means connected in said output transmitting means and controlled by both input and output timing pulses for selecting a storage location of said main data storage means in which selected groups of data signals forming words having a preselected characteristic at a preselected position in each word stored in said intermediate data storage means are to be stored in accordance with the difference between the number of input timing pulses and the number of output timing pulses so that said selected groups of data signals are stored in said main data storage means independently of variation within predetermined limits of the time of occurrence of said data signals in relation to the availability of said storage locations, said output switching means comprising means for comparing the number of input timing pulses with the number of output timing pulses and for providing an output varying in accordance with the difference between said number of input timing pulses and said number of output timing pulses and selecting means for initiating the transmission from said intermediate data storage means to said main data storage means of words having a preselected characteristic at a preselected position in each word, said selecting means comprising reference register means, means for registering signals corresponding to said preselected characteristic in said preselected position in said reference register means, input data register means, means for registering in said input data register means data signals transmitted from said data input source, comparing means for comparing the signals registered in said reference and input data register means and for indicating coincidence in identity and position between said signals corresponding to said predetermined characteristic and said data signals and control means for controlling said output switching means to permit the transfer to said main data storage means of words having preselected characteristic in a preselected position and to prevent the transfer to said main data storage means of other words.

6. A circuit arrangement for selectively transferring data signals from a data input source to a series of storage locations of main data storage means, said main data storage means including a magnetic drum having a data track formed by said storage locations and a timing track having timing signals synchronized with said storage locations recorded therein and further storage means, said circuit arrangement comprising, in combination, input timing pulse generating means for generating input timing pulses synchronized with the data signals of said data input source; output timing pulse generating means for generating output timing pulses from timing signals sensed from said magnetic drum; intermediate data storage means having a plurality of settable data signal storage positions; input transmitting means for transmitting data signals from said data input source to said intermediate data storage means and for recording transmitted data signals in the said intermediate data storage means; input switching means connected in said input transmitting means and controlled by both input and output timing pulses for selecting which storage position of said intermediate data storage means is to be set in accordance with each data signal of said data input source; output transmitting means for transmitting data signals from said intermediate data storage means to said main data storage means and for recording transmitted data signals in successive storage locations of the said main data storage means; and output switching means connected in said output transmitting means and controlled by both input and output timing pulses for selecting a storage location of said main data storage means in which selected groups of data signals forming words having a preselected characteristic at a preselected position in each word stored in the data track of said magnetic drum are to be stored in accordance with the difference between the number of input timing pulses and the number of output timing pulses so that said selected groups of data signals stored in successive storage locations of the data track of said magnetic drum are stored in the further storage means of said main data storage means independently of variation within predetermined limits of the time of occurrence of said data signals in relation to the availability of said storage locations, said output switching means comprising means for comparing the number of input timing pulses with the number of output timing pulses and for providing an output varying in accordance with the difference between said number of input timing pulses and said number of output timing pulses, further transmitting means for transmitting data signals from said magnetic drum to said further storage means of said main data storage means, selecting means for initiating the transmission from said intermediate data storage means to said main data storage means of words having a preselected characteristic at a preselected position in each word, said selecting means comprising reference register means, means for registering signals corresponding to said preselected characteristic in said preselected position in said reference register means, input data register means, means for registering in said input data register means data signals transmitted from said data input source and comparing means for comparing the signals registered in said reference and input data register means and for indiacting coincidence in identity and position between said signals corresponding to said predetermined characteristic and said data signals, further switching means connected in said further transmitting means for controlling the transmission of data signals from said magnetic drum to said further storage means, and further connecting means connecting the comparing means of said selecting means to said further switching means to control said further switching means to permit the transfer to said further storage means of said main data storage means of words having said preselected characteristic in a preselected position and to prevent the transfer to said further storage means of said main data storage means of other words.

7. A circuit arrangement for selectively transferring data signals from a data input source including a magnetic tape having data signals recorded thereon and from which said data signals are sensed serially to a series of storage locations of main data storage means, said main data storage means including a magnetic drum having a data track formed by said storage locations and a timing track having timing signals synchronized with said storage locations recorded therein and further storage means, said circuit arrangement comprising, in combination, input timing pulse generating means for generating input timing pulses from data signals sensed from said magnetic tape; output timing pulse generating means for generating output timing pulses from timing signals sensed from said magnetic drum; intermediate data storage means having a plurality of settable data signal storage positions, said intermediate data storage means comprising a shift register having a plurality of stages, each of said stages comprising a settable data signal storage position and each stage having an input; input transmitting means for transmitting data signals from said data input source to said intermediate data storage means and for recording transmitted data signals in the said intermediate data storage means; input switching means connected in said input transmitting means and controlled by both input and output timing pulses for selecting which storage position of said intermediate data storage means is to be set in accordance with each data signal of said data input source, said input switching means comprising a first plurality of gates, each of said first plurality of gates being adapted to be controlled to one of an open and closed condition and each of the said gates being connected to a corresponding one of said shift register stage inputs, first ring counter means adapted to be operated additively by one of said input and output timing pulses and adapted to be operated subtractively by the other of the said input and output timing pulses, said first ring counter means having a plurality of stages, each of said first ring counter stages being connected to a corresponding one of said first plurality of gates in a manner whereby each of the said first ring counter stages controls the condition of its corresponding gate, and input connecting means for applying said input and output timing pulses to said first ring counter means in a manner whereby the difference between the number of the said input timing pulses and the number of the said output timing pulses controls the condition of said first plurality of gates, said input transmitting means being connected to transmit data signals from said data input source to the inputs of the stages of said shift register through said first plurality of gates; output transmitting means for transmitting data signals from said intermediate data storage means to said main data storage means and for recording transmitted data signals in successive storage locations of the said main data storage means; and output switching means connected in said output transmitting means and controlled by both input and output timing pulses for selecting a storage location of said main data storage means in which selected groups of data signals forming words having a preselected characteristic at a preselected position in each word stored in the data track of said magnetic drum are to be stored in accordance with the difference between the number of input timing pulses and the number of output timing pulses so that said selected groups of data signals stored in successive storage locations of the data track of said magnetic drum are stored in the further storage means of said main data storage means independently of variation within predetermined limits of the time of occurrence of said data signals in relation to the availability of said storage locations, said output switching means comprising a second plurality of gates, each of said second plurality of gates being adapted to be controlled to one of an open and closed condition and each of the said gates being connected to said main data storage means, second ring counter means adapted to be operated additively and subtractively by carry pulses produced by said first ring counter means, said second ring counter means having a plurality of stages, each of said second ring counter stages being connected to a corresponding one of said second plurality of gates in a manner whereby each of the said second ring counter stages controls the condition of its corresponding gate, output connecting means for applying carry pulses produced by said first ring counter means to said second ring counter means in a manner whereby the said second ring counter means adds and subtracts said carry pulses so that the difference between the number of input timing pulses and the number of output timing pulses controls the condition of said second plurality of gates, said output transmitting means being connected to transmit data signals from said shift register to said main data storage means through said second plurality of gates, further transmitting means for transmitting data signals from said magnetic drum to said further storage means of said main data storage means, selecting means for initiating the transmission from said intermediate data storage means to said main data storage means of words having a preselected characteristic at a preselected position in each word, said selecting means comprising reference register means, means for registering signals corresponding to said preselected characteristic in said preselected position in said reference register means, input data register means, means for registering in said input data register means data signals transmitted from said data input source and comparing means for comparing the signals registered in said reference and input data register means and for indicating coincidence in identity and position between said signals corresponding to said predetermined characteristic and said data signals, further switching means connected in said further transmitting means for controlling the transmission of data signals from said magnetic drum to said further storage means, and further connecting means connecting the comparing means of said selecting means to said further switching means to control said further switching means to permit the transfer to said further storage means of said main data storage means of words having said preselected characteristic in a preselected position and to prevent the transfer to said further storage means of said main data storage means of other words.

8. A circuit arrangement for selectively transferring data signals from a data input source including a magnetic tape having data signals recorded thereon and from which said data signals are sensed serially to a series of storage locations of main data storage means, said main data storage means including a magnetic drum having a data track formed by said storage locations and a timing track having timing signals synchronized with said storage locations recorded therein and a plurality of further storage means, said circuit arrangement comprising, in combination, input timing pulse generating means for generating input timing pulses synchronized with data signals recorded on said magnetic tape; output timing pulse generating means for generating output timing pulses from timing signals sensed from said magnetic drum; intermediate data storage means having a plurality of settable data signal storage positions, said intermediate data storage means comprising a shift register having a plurality of stages, each of said stages comprising a settable data signal storage position and each stage having an input; input transmitting means for transmitting data signals from said data input source to said intermediate data storage means and for recording transmitted data signals in the said intermediate data storage means, said input transmitting means including time delay means; input switching means connected in said input transmitting means and controlled by both input and output timing pulses for selecting which storage position of said intermediate data storage means is to be set in accordance with each data signal of said data input source, said input switching means comprising a first plurality of gates, each of said first plurality of gates being adapted to be controlled to one of an open and closed condition and each of the said gates being connected to a corresponding one of said shift register stage inputs, first ring counter means adapted to be operated additively by one of said input and output timing pulses and adapted to be operated subtractively by the other of said input and output timing pulses, said first ring counter means having a plurality of stages, each of said first ring counter stages being connected to a corresponding one of said first plurality of gates in a manner whereby each of the said first ring counter stages controls the condition of its corresponding gate, and input connecting means for applying said input and output timing pulses to said first ring counter means in a manner whereby the difference between the number of the said input timing pulses and the number of the said output timing pulses controls the condition of said first plurality of gates, said input transmitting means being connected to transmit data signals from said data input source to the stages of said shift register through said first plurality of gates through one of a first circuit including said time delay means connecting the said data input source to the said first plurality of gates and a second circuit directly connecting the said data input source to the said first plurality of gates; selecting means for selecting one of said first and second circuits in accordance with the time relationship of said input and output timing pulses; output transmitting means for transmitting data signals from said intermediate data storage means to said main data storage means in synchronism with said output timing pulses and for recording transmitted data signals in successive storage locations of the said main data storage means; and output switching means connected in said output transmitting means and controlled by both input and output timing pulses for selecting a storage location of said main data storage means in which selected groups of data signals forming words having a preselected characteristic at a preselected position in each word stored in the data track of said magnetic drum are to be stored in accordance with the difference between the number of input timing pulses and the number of output timing pulses so that said selected groups of data signals stored in successive storage locations of the data track of said magnetic drum are stored in selected ones of the plurality of further storage means of said main data storage means independently of variation within predetermined limits of the time of occurrence of said data signals in relation to the availability of said storage locations, said output switching means comprising a second plurality of gates, each of said second plurality of gates being adapted to be controlled to one of an open and closed condition and each of the said gates being connected to said main data storage means, second ring counter means adapted to be operated additively and subtractively by carry pulses produced by said first ring counter means, said second ring counter means having a plurality of stages, each of said second ring counter stages being connected to a corresponding one of said second plurality of gates in a manner whereby each of the said second ring counter stages controls the condition of its corresponding gate, output connecting means for applying carry pulses produced by said first ring counter means to said second ring counter means in a manner whereby the said second ring counter means adds and subtracts said carry pulses so that the difference between the number of input timing pulses and the number of output timing pulses controls the condition of said second plurality of gates, said output transmitting means being connected to transmit data signals from said shift register to said main data storage means through said second plurality of gates, further transmitting means for transmitting data signals from said magnetic drum to selected ones of said plurality of further storage means of said main data storage means, selecting means for initiating the transmission from said intermediate data storage means to said main data storage means of words having a preselected characteristic at a preselected position in each word, said selecting means comprising reference register means, means for registering signals corresponding to said preselected characteristic in said preselected position in said reference register means, input data register means, means for registering in said input data register means data signals transmitted from said data input source and comparing means for comparing the signals registered in said reference and input data register means and for indicating coincidence in identity and position between said signals corresponding to said predetermined characteristic and said data signals, further switching means connected in said further transmitting means between said magnetic drum to said plurality of further storage means for controlling the transmission of data signals from said magnetic drum to said further storage means, auxiliary further switching means connected in said further transmitting means between said further switching means and each of said plurality of further storage means and adapted to connect selected ones of said plurality of further storage means to said further switching means, and further connecting means connecting the comparing means of said selecting means to said further switching means to control said further switching means to permit the transfer to said selected ones of said further storage means of said main data storage means of words having said preselected characteristic in a preselected position and to prevent the transfer to said selected ones of said further storage means of said main data storage means of other words.

9. A circuit arrangement for transferring data signals from a data input source to a series of sequentially available storage locations of main data storage means comprising, in combination, main data storage means including a magnetic drum having a data track formed by said storage locations, a timing track having timing signals synchronized with said storage locations recorded therein and an end of sector track having end of sector signals indicating the end of each sector of the data track of said magnetic drum; input timing pulse generating means for generating input timing pulses synchronized with the data signals of said data input source; output timing pulse generating means for generating output timing pulses from timing signals sensed from said magnetic drum; intermediate data storage means having a plurality of settable data signal storage positions; input transmitting means for transmitting data signals from said data input source to said intermediate data storage means and for recording transmitted data signals in the said intermediate data storage means; input switching means connected in said input transmitting means and controlled by both input and output timing pulses for selecting which storage position of said intermediate data storage means is to be set in accordance with each data signal of said data input source; output transmitting means for transmitting data signals from said intermediate data storage means to said main data storage means and for recording transmitted data signals in successive storage locations of the said main data storage means; and output switching means connected in said output transmitting means and controlled by an end of sector signal from said end of sector track for selecting a storage location of the data track of said main data storage means in which selected groups of data signals forming words having a preselected characteristic at a preselected position in each word stored in the data track of said magnetic drum are to be stored so that said selected groups of data signals stored in said intermediate data storage means are stored in predetermined storage locations of the data track of said magnetic drum independently of variation within predetermined limits of the time of occurrence of said data signals in relation to the availability of said storage locations, said output switching means comprising means for deriving end of sector signals from said end of sector track, selecting means for selecting a storage location of the data track of said magnetic drum in accordance with an end of sector signal derived from the said end of sector track and selecting means for initiating the transmission from said intermediate data storage means to said main data storage means of words having a preselected characteristic at a preselected position in each word, said selecting means comprising reference register means, means for registering signals corresponding to said preselected characteristic in said preselected position in said reference register means, input data register means, means for registering in said input data register means data signals transmitted from said data input source, comparing means for comparing the signals registered in said reference and input data register means and for indicating coincidence in identity and position between said signals corresponding to said predetermined characteristic and said data signals and control means for controlling said output switching means to permit the transfer to said main data storage means of words having said preselected characteristic in a preselected position and to prevent the transfer to said main data storage means of other words.

10. A circuit arrangement for selectively transferring data signals from a data input source to a series of sequentially available storage locations of main data storage means comprising, in combination, main data storage means including a magnetic drum having a data track formed by said storage locations, a timing track having timing signals synchronized with said storage locations recorded therein and an end of sector track having end of sector signals indicating the end of each sector of the data track of said magnetic drum; input timing pulse generating means for generating input timing pulses synchronized with the data signals of said data input source; output timing pulse generating means for generating output timing pulses from timing signals sensed from said magnetic drum; intermediate data storage means having a plurality of settable data signal storage positions, said intermediate data storage means comprising a plurality of shift registers each having a plurality of data storage positions, each of said shift registers having a pair of inputs; input transmitting means for transmitting data signals from said data input source to said intermediate data storage means and for recording transmitted data signals in the said intermediate data storage means; input switching means connected in said input transmitting means and controlled by both input and output timing pulses for selecting which storage position of said intermediate data storage means is to be set in accordance with each data signal of said data input source, said input switching means including a first plurality of gates, each of said first plurality of gates being adapted to be controlled to one of an open and closed condition and each of the said gates being connected to an input of a corresponding one of said shift registers, said input transmitting means being connected to transmit data signals from said data input source to one of the inputs of said shift registers through said first plurality of gates so that the said first plurality of gates controls the selective transmission of data signals to the said shift registers, a second plurality of gates, each of said second plurality of gates being adapted to be controlled to one of an open and closed condition and each of the said gates being connected to the other input of a corresponding one of said shift registers, said input transmitting means being connected to transmit input timing pulses from said input timing pulse generating means to the other of the inputs of said shift registers through said second plurality of gates in a manner whereby the said second plurality of gates controls the selective transmission of input timing pulses to the said shift registers, said input timing pulses controlling the said shift registers as shifting pulses, and input control means for controlling the condition of said first and second plurality of gates; output transmitting means for transmitting data signals from said intermediate data storage means to said main data storage means and for recording transmitted data signals in successive storage locations of the said main data storage means; and output switching means connected in said output transmitting means and controlled by an end of sector signal from said end of sector track for selecting a storage location of the data track of said main data storage means in which selected groups of data signals forming words having a predetermined characteristic at a preselected position in each word stored in the data track of said magnetic drum and to be stored so that said selected groups of data signals stored in each intermediate data storage means are stored in predetermined storage locations of the data track of said magnetic drum independently of variation within predetermined limits of the time of occurrence of said data signals in relation to the availability of said storage locations, said output switching means comprising means for deriving end of sector signals from said end of sector track, selecting means for selecting a storage location of the data track of said magnetic drum in accordance with an end of sector signal derived from the said end of sector track and selecting means for initiating the transmission from said intermediate data storage means to said main data storage means of words having a preselected characteristic at a preselected position in each word, said selecting means comprising reference register means, means for registering signals corresponding to said preselected characteristic in said preselected position in said reference register means, input data register means, means for registering in said input data register means data signals transmitted from said data input source, comparing means for comparing the signals registered in said reference and input data register means and for indicating coincidence in identity and position between said signals corresponding to said predetermined characteristic and said data signals and control means for controlling said output switching means to permit the transfer to said main data storage means of words having said preselected characteristic in a preselected position and to prevent the transfer to said main data storage means of other words.

11. A circuit arrangement for selectively transferring data signals from a data input source to a series of sequentially available storage locations of main data storage means comprising, in combination, main data storage means including a magnetic drum having a data track formed by said storage locations, a timing track having timing signals synchronized with said storage locations recorded therein and an end of sector track having end of sector signals indicating the end of each sector of the data track of said magnetic drum; input timing pulse generating means for generating input timing pulses synchronized with the data signals of said data input source; output timing pulse generating means for generating output timing pulses from timing signals sensed from said magnetic drum; intermediate data storage means having a plurality of settable data signal storage positions, said intermediate data storage means comprising a plurality of shift registers each having a plurality of data storage positions, each of said shift registers having a pair of inputs; input transmitting means for transmitting data signals from said data input source to said intermediate data storage means and for recording transmitted data signals in the said intermediate data storage means; input switching means connected in said input transmitting means and controlled by both input and output timing pulses for selecting which storage position of said intermediate data storage means is to be set in accordance with each data signal of said data input source, said input switching means including a first plurality of gates, each of said first plurality of gates being adapted to be controlled to one of an open and closed condition and each of the said gates being connected to an input of a corresponding one of said shift registers, said input transmitting means being connected to transmit data signals from said data input source to one of the inputs of said shift registers through said first plurality of gates so that the said first plurality of gates controls the selective transmission of data signals to the said shift registers, a second plurality of gates, each of said second plurality of gates being adapted to be controlled to one of an open and closed condition and each of the said gates being connected to the other input of a corresponding one of said shift registers, said input transmitting means being connected to transmit input timing pulses from said input timing pulse generating means to the other of the inputs of said shift registers through said second plurality of gates in a manner whereby the said second plurality of gates controls the selective transmission of input timing pulses to the said shift registers, said input timing pulses controlling the said shift registers as first shifting pulses, first control means for controlling the condition of said first and second plurality of gates, a third plurality of gates, each of said third plurality of gates being adapted to be controlled to one of an open and closed condition and each of the said gates being connected to said other input of a corresponding one of said shift registers, connecting means for transmitting output timing pulses from said output timing pulse generating means to said other of the inputs of said shift registers through said third plurality of gates in a manner whereby the said third plurality of gates controls the selective transmission of output timing pulses to the said shift registers, said output timing pulses controlling the said shift registers as second shifting pulses, and second control means for controlling the condition of said third plurality of gates, said second control means including counter means adapted to control the condition of said third plurality of gates in a manner whereby the said third plurality of gates controls the selective transmission of output timing pulses to the said shift registers and counter control means for applying said input timing pulses and said end of sector signals to said counter means in a manner whereby the said input timing pulses and the said end of sector signals control the condition of said third plurality of gates; output transmitting means for transmitting data signals from said intermediate data storage means to said main data storage means and for recording transmitted data signals in successive storage locations of the said main data storage means; and output switching means connected in said output transmitting means and controlled by an end of sector signal from said end of sector track for selecting a storage location of the data track of said main data storage means in which selected groups of data signals forming words having a predetermined characteristic at a preselected position in each word stored in the data track of said magnetic drum are to be stored so that said selected groups of data signals stored in said intermediate data storage means are stored in predetermined storage locations of the data track of said magnetic drum independently of variation within predetermined limits of the time of occurrence of said data signals in relation to the availability of said storage locations, said output switching means comprising means for deriving end of sector signals from said end of sector track, selecting means for selecting a storage location of the data track of said magnetic drum in accordance with an end of sector signal derived from the said end of sector track and selecting means for initiating the transmission from said intermediate data storage means to said main data storage means of words having a preselected characteristic at a preselected position in each word, said selecting means comprising reference register means, means for registering signals corresponding to said preselected characteristics in said preselected position in said reference register means, input data register means, means for registering in said input data register means data signals transmitted from said data input source, comparing means for comparing the signals registered in said reference and input data register means and for indicating coincidence in identity and position between said signals corresponding to said predetermined characteristic and said data signals and control means for controlling said output switching means to permit the transfer to said main data storage means of words having said preselected characteristic in a preselected position and to prevent the transfer to said main data storage means of other words.

References Cited in the file of this patent

UNITED STATES PATENTS

| | | |
|---|---|---|
| 2,679,035 | Daniels | May 18, 1954 |
| 2,913,706 | Thorensen | Nov. 17, 1959 |